United States Patent [19]

Hosaka et al.

[11] Patent Number: 4,678,571

[45] Date of Patent: Jul. 7, 1987

[54] WATER PURIFIER

[75] Inventors: Nobuyoshi Hosaka; Tasuku Shimizu; Kenzo Mikada; Kozo Tamura; Masatoshi Tanabe, all of Ibaraki, Japan

[73] Assignee: Hitachi, Ltd., Tokyo, Japan

[21] Appl. No.: 830,753

[22] Filed: Feb. 19, 1986

[30] Foreign Application Priority Data

Feb. 20, 1985 [JP] Japan .................................. 60-30323

[51] Int. Cl.⁴ ............................. C02F 1/28; C02F 1/68
[52] U.S. Cl. ..................................... 210/202; 210/266; 210/321.1; 210/501; 210/504
[58] Field of Search ............... 210/638, 668, 679, 764, 210/198.1, 202, 266, 321.1, 501, 502.1, 504, 506

[56] References Cited

U.S. PATENT DOCUMENTS 3,327,859  6/1967  Pall .................................. 210/502.1
3,872,013  3/1975  Nishino et al. ..................... 210/501
4,451,341  5/1984  Miller ................................ 204/149

Primary Examiner—Ivars Cintins
Attorney, Agent, or Firm—Antonelli, Terry & Wands

[57] ABSTRACT

A water purifier has a deodorization tank for removing ions and odorants by adsorption from running water and a mesh filter for removing dust. The mesh filter is arranged at a water entrance of the deodorization tank. The deodorization tank contains an anti-bacterial membrane having a function of imparting an antibacterial activity to the water by supplying mineral ions to the running water and thereby alkalifying the water. The deodorization tank also has a water exit which is associated with a mineral supply filter for supplying a mineral component to the running water. The mineral supply filter is prepared by molding a powder obtained by adhering a material such as soda glass to the surface of heat-decomposed calcium carbonate.

6 Claims, 5 Drawing Figures

WATER PURIFIER

BACKGROUND OF THE INVENTION

1. Field of the Invention

This invention relates to a water purifier for domestic use, suitable for use in a non-recycling running water system.

2. Description of the Prior Art

A water purifier is disclosed in U.S. Pat. No. 4,451,341. This water purifier comprises a first step of passing water through a filter for removing dusts, a second step of removing nonelectrolytes from the water by passing it through an electrolysis chamber, a third step of removing metal ions from the water by oxidizing the metal ions, a fourth step of sterilizing the water by passing it through a chamber containing dissolved silver ions, and a fifth step of removing miscellaneous contaminants by adsorption from the water by passing it through a layer of active carbon, but this process is not one that has two functions, i.e. a sterilization function realized by making the water weakly alkaline and a function of supplying a mineral component.

SUMMARY OF THE INVENTION

It is an object of this invention to provide a water purifier which has a function of inhibiting the growth of bacteria and a function of supplying a mineral component.

The water purifier of this invention is one having a deodorization tank for removing ions and odorants by adsorption from running water, which comprises an antibacterial membrane having a main function of imparting an antibacterial activity to the running water by alkalifying the water by supplying calcium ions and a subsidiary function of removing unnecessary ions and odorants and a mineral supply tank having a function of supplying a necessary amount of calcium ions or the like to the running water and thereby alkalifying the water and imparting an antibacterial activity thereto.

It is an object of this invention to provide a water purifier suitable for supplying drinking water, which can inhibit the growth of bacteria in the remaining water even in an inoperative state (during which no purified water is supplied) and supplying a mineral component to the remaining water, especially, a water purifier suitable for domestic use.

DETAILED DESCRIPTION OF THE INVENTION

Figure 1:
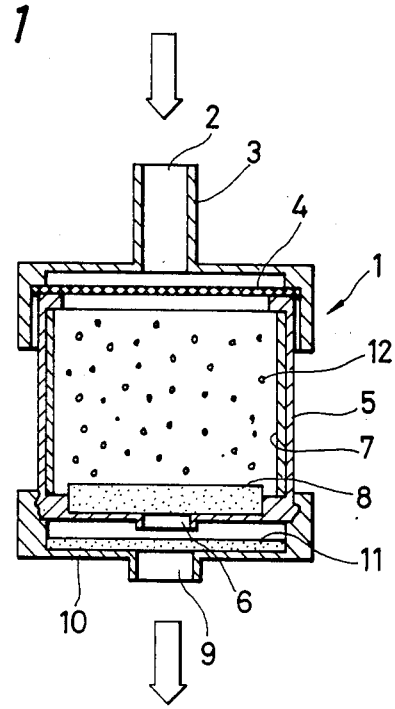
FIG. 1 is a sectional view of a water purifier according to this invention.
Figure 2:
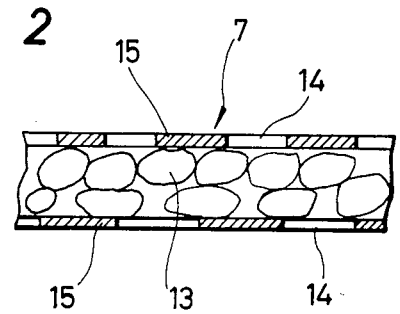
FIG. 2 is an enlarged sectional view of an antibacterial membrane provided in the water purifier according to this invention.
Figure 3:
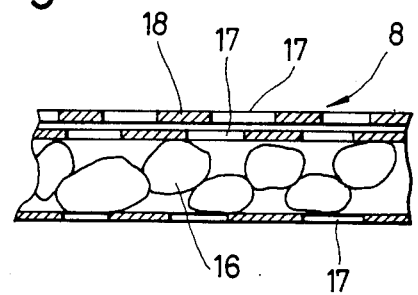
FIG. 3 is an enlarged sectional view of a mineral supply filter provided in the water purifier according to this invention.

As FIG. 1 shows, a deodorization tank 1 comprises a cover 3 having a water entrance 2, a mesh filter 4, and a tank 5. The tank 5 has an opening at its top and is provided with a water exit 6 on its bottom and an antibacterial membrane 7 on its inner wall. Further, this tank 5 is provided with a dust removing filter 8 at the water exit 6. The mesh filter 4 has a function of removing coarse dusts such as sand from the running water, and this filter is one prepared by molding a fiber of vinyl chloride, polyethylene, polyester, or acrylic resin or a thin wire of copper or a copper alloy and having a number of fine pores (pore diameter of $1 \sim 3.0$ mm) in the form of a mesh. The cover 3 is disengageably set on the tank, and the tank 5 is provided similarly disengageably, on the bottom, with a mineral supply tank 10 having a water exit 9. The mineral supply tank 10 is further provided with a mineral supply filter 11. The tank 5 is packed with active carbon (particle diameter of $0.1 \sim 3.0$ mm) having a main function of removing odorants, for example, chlorine gas added for sterilization and miscellaneous organic odorants, from the running water and a subsidiary function of adsorbing unnecessary ions, such as metal, chloride, or sulfate ions. The deodorant 12 comprises one selected from among coconut shell active carbon, antibacterial active carbon which obtained by adhering heat-decomposed calcium carbonate to the surface of it, zeolite, igneous rock, quarty-porphy, soda glass, vermiculite, perlite and mixtures thereof. Although the main function of the antibacterial membrane 7 is to inhibit the growth of bacteria in tank 5, it has a subsidiary function of removing odorants from the running water. FIG. 2 shows its structure. More particularly, the antibacterial membrane 7 is one prepared by molding a powder obtained by adhering heat-decomposed (at about 900° C.) calcium carbonate to the surface of active carbon (particle diameter of $0.1 \sim 3.0$ mm) 13 and sandwiched between resin films 15 (particularly, porous polyethylene, porous polystyrene, foamed urethane, etc.) having pores (pore diameter of $1.0 \sim 50$ $\mu$m) 14. The main function of the antibacterial membrane 7, i.e. inhibition of the growth of bacteria, can be brought about by the ability of the heat-decomposed calcium carbonate to weakly alkalify the running water, since bacteria such as Bacillus or Pseudomonas generally like acidic environments. Further, the antibacterial membrane 7 has a subsidiary function of removing odorants and this function can be realized by the adsorptivity of active carbon. The mineral supply filter 11 has a function of supplying a mineral component such as calcium ion ($Ca^{2+}$) or potassium ion ($K^+$) to the remaining water and running water and FIG. 3 shows its structure. More particularly, this filter 11 is one prepared by molding a powder obtained by adhering a member selected from among soda glass, quartz, vermiculite, perlite, pumice, and mixtures thereof to the surface of heat-decomposed calcium carbonate 16 (particle diameter of $0.1 \sim 5.0$ mm) and sandwiched between resin films 18 having pores 17 (pore diameter of $10 \sim 1000$ $\mu$m). Films of polyester or polyethylene resin, or those of foamed polystyrene or foamed urethane are used as the resin film 18.

The running water which has passed the pores 17 forms droplets within the calcium carbonate or potassium carbonate and reacts with it. Thus, the running water is weakly alkalified by dissolution of calcium ions or potassium ions in it. The alkalinity of the running water is strengthened by placing a large amount of heat-decomposed calcium carbonate or potassium carbonate between the resin films 18.

In an example of the mineral supply filter 11, a mixture is formed by uniformly mixing 50 wt. % of calcium carbonate ($CaCO_3$) with 10 wt. % of soda glass powder (particle diameter of 0.1~5.0 mm), 37 wt. % of perlite, and the balance of a clay powder having a bindability and burning this mixture of heating to the decomposition temperature of calcium carbonate. In this way, a filter containing 50~70 ppm/100 cc of $Ca^{2+}$ ions can be obtained.

The dust removing filter 8 has a main function of removing dusts from the running water when the dusts pass the tank 5. The mineral supply filter 11 has a subsidiary function of inhibiting the growth of bacteria in the water purifier when the purifier is inoperative.

The dust removing filter 8 is one prepared by molding a porous resin such as polyethylene, polypropylene, polystyrene, polyurethane, silicon, polyvinyl chloride, polytetrafluoroethylene, or polyhexafluoropropylene, and having a number of pores (pore diameter of 0.1~3.0 mm).

In the water purifier having the above structure, the running water enters it from a water entrance 2, passes a mesh filter 4 to remove dusts such as sand and then passes a deodorant 12 in the tank to remove odorants. The running water further passes a mineral supply filter 11 to remove dust and then passes a mineral supply filter 11 where it is weakly alkalified by dissolution of calcium or potassium ions in it, and leaves the purifier from a water exit 9. Therefore, even if the running water remains on the bottom of the mineral supply tank 10 when the water purifier is temporarily brought into an inoperative state, bacteria do not grow in the remaining water and, besides, a mineral component is supplied thereto. Therefore, it is very suitable as drinking water.

Figure 4:
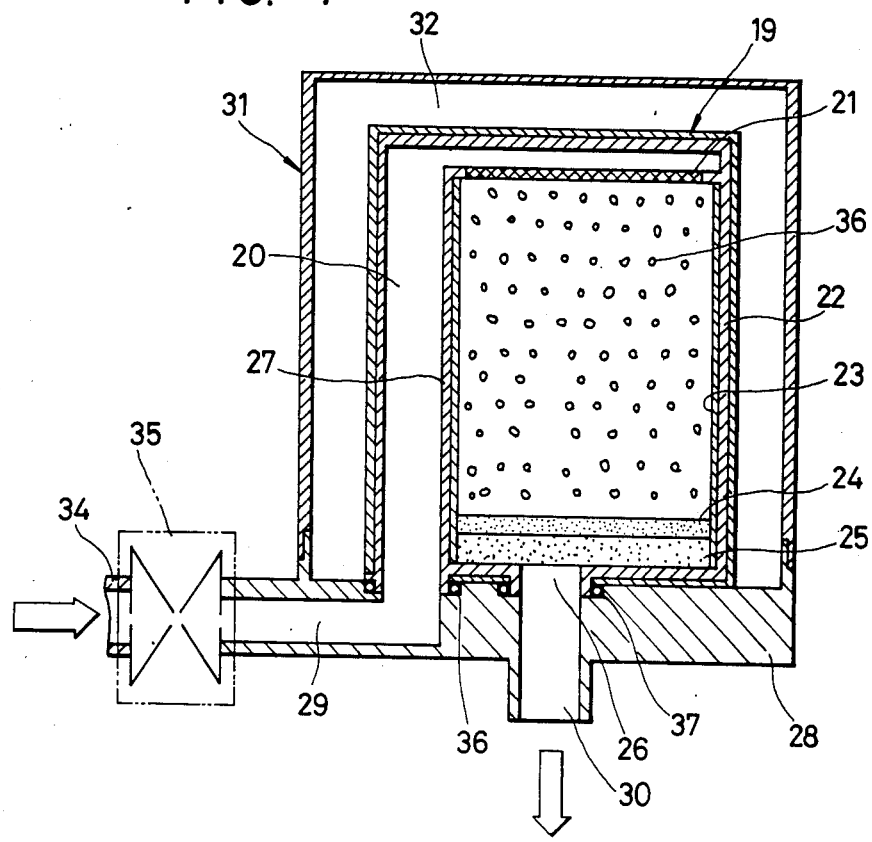
FIG. 4 is a sectional view of a water purifier as another example of this invention.

FIG. 4 shows another example of the water purifier which is attachable to a domestic water pipe, has a structure allowing easy exchange of a cartridge, and has a compact structure as a whole. The water purifying tank 19 of an exchangeable cartridge type is composed of a water entrance 20, a mesh filter 21, a deodorization tank 22, an antibacterial membrane 23, a mineral supply filter 24, a dust removing filter 25, and a water exit 26, and its outer wall is coated with an antibacterial membrane 27. A base 28 has a water entrance 29 and water exit 30 in positions which coincide with said water entrance 20 and said water exit 26, respectively, and a cap 31 is disengageably fixed on the base. A space 32 through which no running water is passed is formed between the cap 31 and the water purifying tank 19. A valve 35 for stopping or passing water is placed between a pipe 34 for feed water and the water entrance 29 of said base, and seal rings 36 and 37 are fixed for preventing leakage of running water. The water purifying tank 22 is packed with a deodorant 36. The function and material of each of a mesh filter 21, an antibacterial membrane 23, a mineral supply film 24, a dust removing filter 25 and a deodorant 36 are the same as those shown in FIG. 1.

Figure 5:
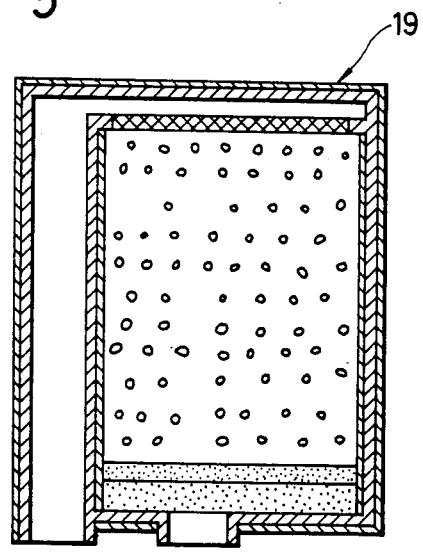
FIG. 5 is a sectional view of a water purifying tank provided in this water purifier as another example of this invention.

When part or all of the functions of the mesh filter 21, antibacterial membrane 23, mineral supply filter 24, dust removing filter 25, and deodorant 36 in the water purifier having the above structure are lost after a long-time service, these elements can be easily exchanged for new ones by removing the cap 31 from the base 28 and further removing the water purifying tank 19 (See FIG. 5.).

We claim:

1. A water purifier comprising a deodorization tank for removing ions and odorants by adsorption from running water, said tank having a water entrance and a water exit, and a mesh filter for removing dusts, said mesh filter being arranged at the water entrance of said deodorization tank, said deodorization tank containing an antibacterial membrane having a function of imparting an antibacterial activity to the water by supplying mineral ions to the running water and thereby alkalifying the water, and the water exit of said deodorization tank being operatively associated with a mineral supply filter for supplying a mineral component to the running water, said mineral supply filter being prepared by molding a powder obtained by adhering a member selected from the group consisting of soda glass, quartz, vermiculite, perlite, pumice, and mixtures thereof to the surface of heat-decomposed calcium carbonate.

2. A water purifier according to claim 1, wherein said antibacterial membrane is provided on the inner wall of said deodorization tank.

3. A water purifier according to claim 2, wherein said antibacterial membrane is one prepared by molding a powder obtained by adhering heat-decomposed calcium carbonate to the surface of active carbon.

4. A water purifier according to claim 3, wherein said antibacterial membrane is one prepared by molding a powder obtained by adhering heat-decomposed calcium carbonate to the surface of active carbon and sandwiched between sheets having a number of pores.

5. A water purifier according to claim 1, wherein said powder obtained by adhering a member selected from the group consisting of soda glass, quartz, vermiculite, perlite, pumice, and mixtures thereof to the surface of heat-decomposed calcium carbonate is sandwiched between sheets having a number of pores.

6. A water purifier comprising a deodorization tank for removing ions and odorants by adsorption from running water, said tank having a water entrance and a water exit, and a mesh filter for removing dusts, said mesh filter being arranged at the water entrance of said deodorization tank, a wall of said deodorization tank having an antibacterial membrane prepared by molding a powder obtained by adhering heat-decomposed calcium carbonate to the surface of active carbon, and the water exit of said deodorization tank being operatively associated with a mineral supply filter prepared by molding a powder obtained by adhering a member selected from the group consisting of soda glass, quartz glass, vermiculite, perlite, pumice, and mixtures thereof to the surface of heat-decomposed calcium carbonate, a the lower part of said mineral supply filter including a dust removing filter.

* * * * *